(12) United States Patent
Bui et al.

(10) Patent No.: US 8,094,402 B2
(45) Date of Patent: Jan. 10, 2012

(54) SYSTEMS AND METHODS FOR CORRECTING MAGNETIC TAPE DIMENSIONAL INSTABILITY

(75) Inventors: Nhan X. Bui, Tucson, AZ (US); Edwin R. Childers, Tucson, AZ (US); Eric R. Christensen, Tucson, AZ (US); Reed A. Hancock, Tucson, AZ (US); Diana J. Hellman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 12/686,302

(22) Filed: Jan. 12, 2010

(65) Prior Publication Data

US 2011/0170214 A1    Jul. 14, 2011

(51) Int. Cl.
   G11B 17/00   (2006.01)
   G11B 5/584   (2006.01)
   G11B 20/20   (2006.01)

(52) U.S. Cl. ....... 360/71; 360/76; 360/77.12; 242/334.6
(58) Field of Classification Search ........................ None
See application file for complete search history.

(56) References Cited

U.S. PATENT DOCUMENTS

| | | | |
|---|---|---|---|
| 5,181,150 A | 1/1993 | Hayakawa et al. | 360/121 |
| 5,771,142 A | 6/1998 | Maurice et al. | 360/121 |
| 5,953,184 A | 9/1999 | Barber et al. | 360/121 |
| 5,959,812 A | 9/1999 | Rothermel | 360/118 |
| 6,040,963 A | 3/2000 | Rothermel | 360/118 |
| 6,141,174 A * | 10/2000 | Judge et al. | 360/76 |
| 6,222,698 B1 | 4/2001 | Barndt et al. | 360/76 |
| 7,193,812 B2 | 3/2007 | Eaton | 360/121 |
| 7,382,569 B2 | 6/2008 | Biskeborn et al. | 360/77.12 |
| 7,876,521 B2 * | 1/2011 | Cherubini et al. | 360/71 |
| 2004/0141250 A1 * | 7/2004 | Harper et al. | 360/71 |
| 2005/0254161 A1 * | 11/2005 | Nakao | 360/77.12 |
| 2006/0103968 A1 | 5/2006 | Jurneke | 360/76 |
| 2009/0128949 A1 * | 5/2009 | Matsuno et al. | 360/77.12 |

FOREIGN PATENT DOCUMENTS

JP    58177518 A    10/1983

* cited by examiner

*Primary Examiner* — Andrew L Sniezek
(74) *Attorney, Agent, or Firm* — Zilka-Kotab, PC

(57) ABSTRACT

Magnetic tape devices encounter read and/or write errors when the tape is not being passed across the head with the proper tension and/or skew angle. According to one embodiment, a system which corrects for these problems comprises a head having an array of at least one of readers and writers, a drive mechanism for passing a magnetic recording tape over the head, a skew-inducing mechanism coupled to the head for adjusting a skew angle of a longitudinal axis of the array relative to a direction normal to a direction of tape travel over the head, and a controller in communication with the head. The system also determines a tape dimensional stability state of the tape and adjust the skew angle away from normal to the direction of tape travel and lowers a tension of the tape across the head if the tape dimensional stability state is in a contracted state.

19 Claims, 5 Drawing Sheets

SYSTEMS AND METHODS FOR CORRECTING MAGNETIC TAPE DIMENSIONAL INSTABILITY

BACKGROUND

As the track density on magnetic tape products continues to increase, the track placement has become more sensitive to minor tolerances and dimensions in the head, servo, format, etc. One factor of particular concern is the Tape Dimensional Stability (TDS), which is a measure of positional stability of magnetic data tracks relative to each other. The environmental effects of temperature, humidity, tension, aging, etc., on the magnetic tape are such that the relative position of the tracks can and do change during reading and writing to the point that read back signal quality is detrimentally affected, especially if there is too much relative movement between magnetic data tracks, possibly leading to read back failure.

Therefore, a solution that can address the shortcomings of current methodologies and systems to improve data storage rates and/or efficiency would be beneficial.

SUMMARY

According to one embodiment, a system comprises a head having an array of at least one of readers and writers, a drive mechanism for passing a magnetic recording tape over the head, a skew-inducing mechanism coupled to the head for adjusting a skew angle of a longitudinal axis of the array relative to a direction normal to a direction of tape travel over the head, and a controller in communication with the head. The system is operative to determine a tape dimensional stability state of the tape and adjust the skew angle away from normal to the direction of tape travel and lower a tension of the tape across the head if the tape dimensional stability state is in a contracted state.

According to another embodiment, a system comprises a head having an array of at least one of readers and writers, a drive mechanism for passing a magnetic recording tape over the head, and a controller in communication with the head. The system is operative to determine a tape dimensional stability state of the tape, lower a tension of the tape across the head if the tape dimensional stability state is in a contracted state, and increase a tension of the tape across the head if the tape dimensional stability state is in an expanded state.

In another embodiment, a method for writing to a magnetic recording tape includes determining a tape dimensional stability state of a magnetic recording tape, lowering a tension of the tape across the head if the tape dimensional stability state is in a contracted state, adjusting a skew angle of an array of writers away from normal to a direction of tape travel if the tape dimensional stability state is in the contracted state, increasing a tension of the tape across the head if the tape dimensional stability state is in an expanded state, adjusting the skew angle toward normal to a direction of tape travel if the tape dimensional stability state is in the expanded state, and writing data to the tape.

A method for reading from a magnetic recording tape, in another embodiment, includes initiating a reading operation with a skew angle of an array of writers at a nominal value and a tension of the tape across the head at a nominal value, and performing an error recovery procedure if a read error occurs. The error recovery procedure includes determining a tape dimensional stability state of a magnetic recording tape, lowering the tension of the tape across the head if the tape dimensional stability state is in a contracted state, adjusting a skew angle of an array of readers away from normal to a direction of tape travel if the tape dimensional stability state is in the contracted state, increasing the tension of the tape across the head if the tape dimensional stability state is in an expanded state, and adjusting the skew angle toward normal to a direction of tape travel if the tape dimensional stability state is in the expanded state.

Other aspects and embodiments of the present invention will become apparent from the following detailed description, which, when taken in conjunction with the drawings, illustrate by way of example the principles of the invention.

DETAILED DESCRIPTION

Figure 1:
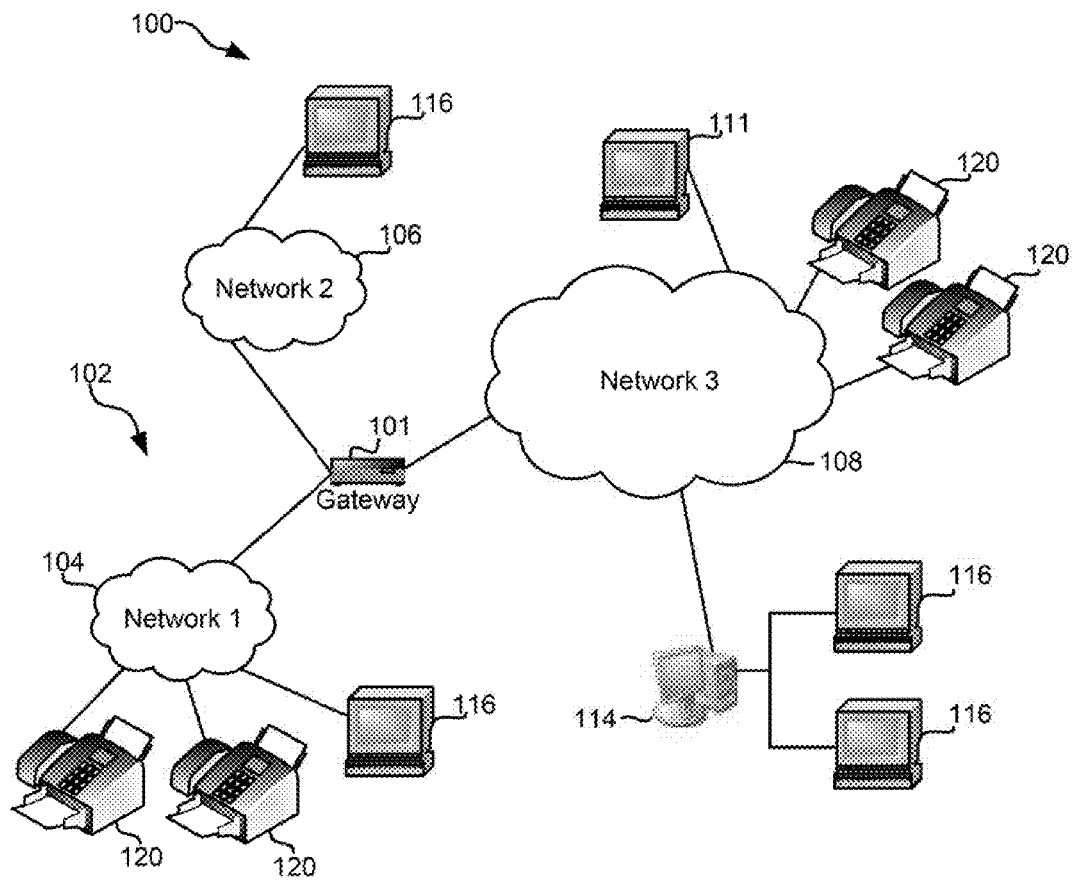
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to some preferred embodiments, systems and methods of mitigating and/or eliminating some of the detrimental effects of magnetic data track motion during reading and writing operations are presented. In some embodiments, the head skew and tape tension may be adjusted during both the writing and reading operations. These corrections of head skew and tape tension in which a previous writing operation took place may also be saved, along with other head conditions, on the cartridge memory (CM) for possible use in a future reading process, e.g., the track spacing conditions at which the writing took place can be duplicated when attempting to read the written data from the tape.

In one general embodiment, a system includes a head having an array of at least one of readers and writers, a skew-inducing mechanism coupled to the head for adjusting a skew angle of a longitudinal axis of the array relative to a direction normal to a direction of tape travel over the head, a drive mechanism for passing a magnetic recording tape over the head, and a controller in communication with the head. The system is operative to determine a tape dimensional stability state of the tape and to adjust the skew angle away from normal to the direction of tape travel and lower a tension of the tape across the head if the tape dimensional stability state is in a contracted state.

In another general embodiment, a system comprises a head having an array of at least one of readers and writers, a drive mechanism for passing a magnetic recording tape over the head, and a controller in communication with the head. The system is operative to determine a tape dimensional stability state of the tape, to lower a tension of the tape across the head if the tape dimensional stability state is in a contracted state, and to increase a tension of the tape across the head if the tape dimensional stability state is in an expanded state.

In another general embodiment, a method for writing to a magnetic recording tape includes determining a tape dimensional stability state of a magnetic recording tape, lowering a tension of the tape across the head if the tape dimensional stability state is in a contracted state, adjusting a skew angle of an array of writers away from normal to a direction of tape travel if the tape dimensional stability state is in the contracted state, increasing a tension of the tape across the head if the tape dimensional stability state is in an expanded state, adjusting the skew angle toward normal to a direction of tape travel if the tape dimensional stability state is in the expanded state, and writing data to the tape.

In another general embodiment, a method for reading from a magnetic recording tape includes initiating a reading operation with a skew angle of an array of writers at a nominal value and a tension of the tape across the head at a nominal value and performing an error recovery procedure if a read error occurs. The error recovery procedure includes determining a tape dimensional stability state of a magnetic recording tape, lowering the tension of the tape across the head if the tape dimensional stability state is in a contracted state, adjusting a skew angle of an array of readers away from normal to a direction of tape travel if the tape dimensional stability state is in the contracted state, increasing the tension of the tape across the head if the tape dimensional stability state is in an expanded state, and adjusting the skew angle toward normal to a direction of tape travel if the tape dimensional stability state is in the expanded state.

As will be appreciated by one skilled in the art, the present invention may be embodied as a system, method or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
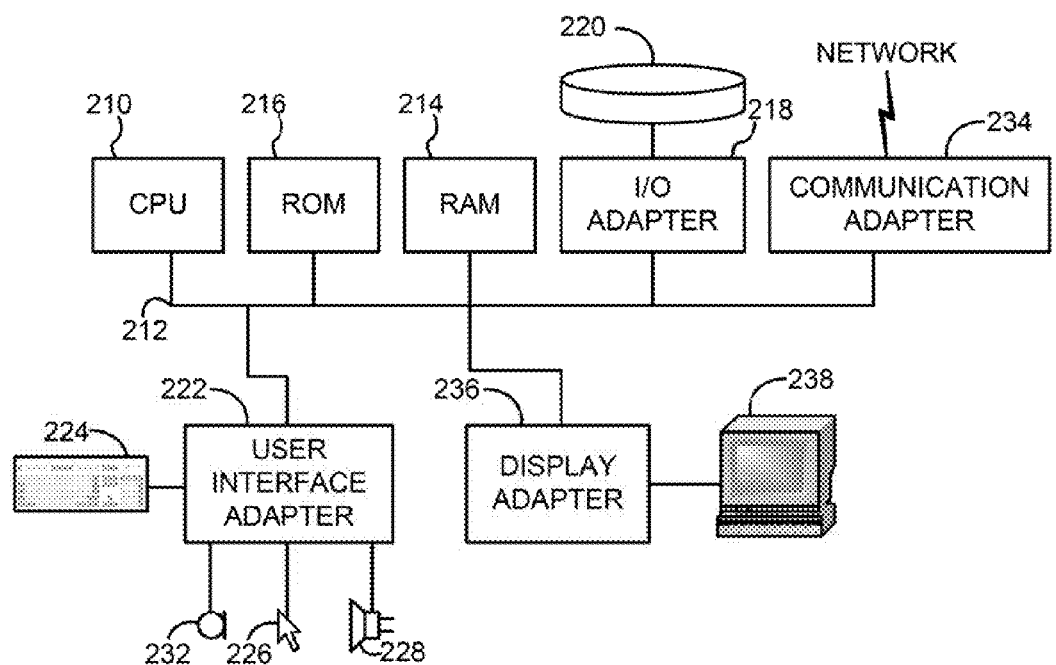
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In some embodiments, the systems and methods described herein are capable of detecting the tape dimensional stability (TDS) state of a tape by measuring the distance between two servo patterns. This detection may be performed by measuring the A and B counts of the servo and determining the head index on each servo pattern. Specifically, in some approaches, the indices may be identical when there is no tape distortion in the tape width direction. If a distortion is detected, the direction and magnitude of the distortion can be detected. If the servo-to-servo distance is detected to be closer than desired, the TDS state is in a contracted or "shrunk" state. If the servo-to-servo distance is larger than desired, then the TDS is in an "expanded" state. If a shrunk state is detected, the system can compensate by adjusting the head skew and/or tape tension so as to minimize the effects of distortion of this state during any writing and/or reading processes. If an expanded state is detected, again, the system can compensate for this state during any writing and/or reading processes with adjustments to the head skew and/or tape tension.

Figure 3:
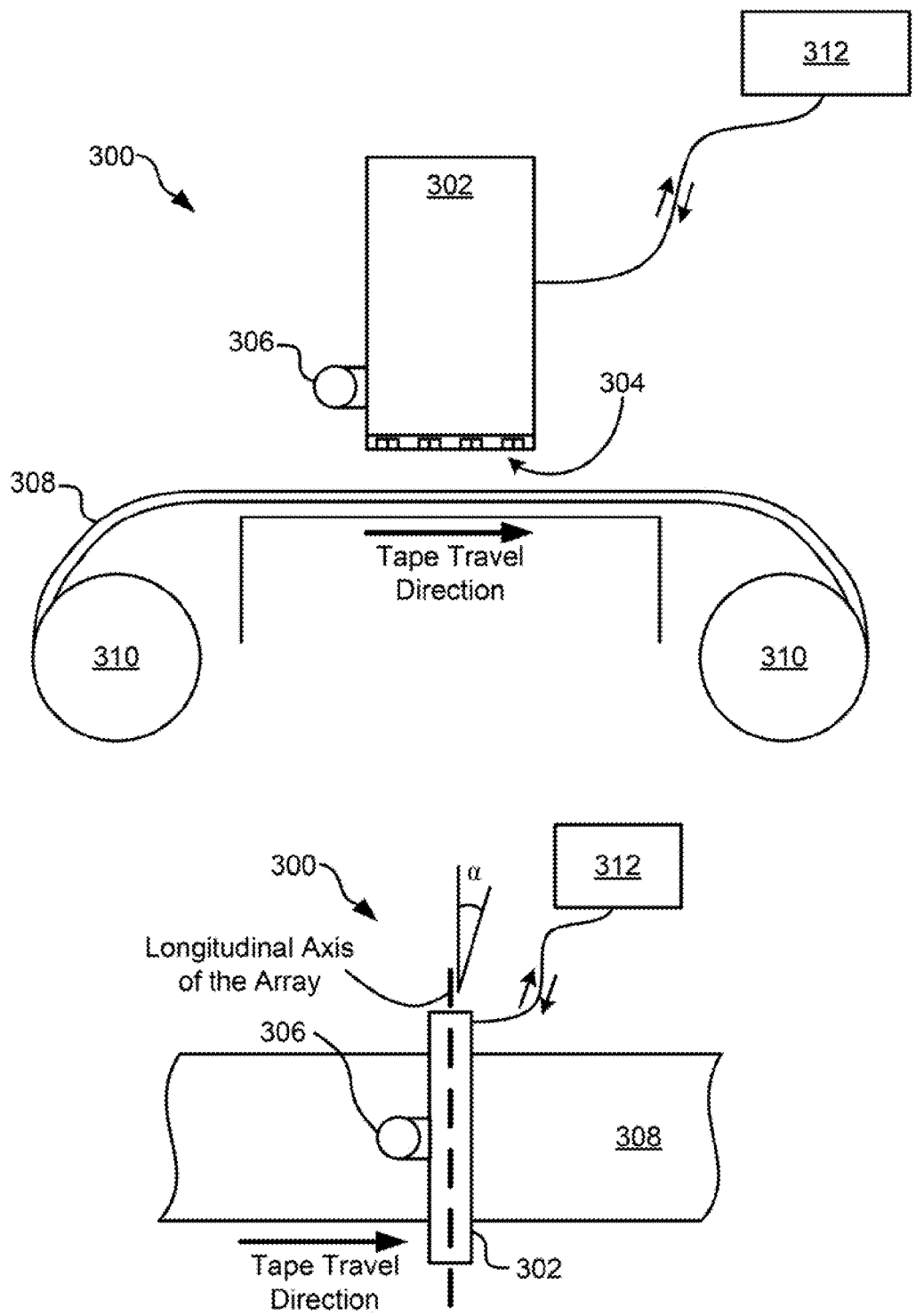
FIG. 3 depicts a simplified schematic diagram of a system according to one embodiment.

Now, specific embodiments are described in relation to FIG. 3.

In one embodiment, a system 300 includes a head 302 having an array 304 of readers, writers, servos, etc. (the array 304 includes at least readers and/or writers). The system 300 may also include more than one array of elements, such as one or more arrays of writers, one or more arrays of readers, and one or more arrays of servos. Any combination of readers, writers, combinations or reader/writer elements, etc., may be used in one or more arrays as these arrangements are specific to each individual head, and are not to be limited by the embodiments described herein.

The system 300 also includes a skew-inducing mechanism 306 (such as an actuator, piezo device, worm screw device, etc.) coupled to the head 302 for adjusting a skew angle $\alpha$ of a longitudinal axis of the array 304 relative to a direction normal to a direction of tape travel over the head 302 and parallel to a plane of a magnetic recording tape 308. In addition, the system 300 includes a drive mechanism 310 for passing the magnetic recording tape 308 over the head 302 and a controller 312 in communication with the head 302, with the controller 312 being an ASIC, microprocessor, FPGA, or any other type of processing device presented herein, etc. The system 300, e.g., using the controller 312, other devices, or a combination thereof, is operative to determine a TDS state of the tape 308 and adjust the skew angle $\alpha$ away from normal to the direction of tape travel (e.g., relative to its current setting, relative to a nominal or default skew angle, etc.) and lower a tension of the tape 308 across the head 302 (e.g., from its current setting, relative to a nominal or default tension, etc.) if the TDS state is in a contracted ("shrunk") state.

In some approaches, the system 300 may be further operative to adjust the skew angle $\alpha$ toward normal to the direction of tape travel including adjusting the skew angle $\alpha$ to 0° if the skew angle $\alpha$ is not already 0° (e.g., relative to its current setting, relative to a nominal or default skew angle, etc.) and increase a tension of the tape 308 across the head 302 (e.g., from its current setting, relative to a nominal or default tension, etc.) if the TDS state is in an "expanded" state. In addition, in some further approaches, the system 300 may be operative to read from or write to the tape 308 with the skew angle $\alpha$ at a nominal angle (e.g., 0° or some default skew angle) relative to normal to the direction of tape travel if the TDS state is not in an "expanded" state or a contracted ("shrunk") state. Furthermore, the system 300 may be further operative to determine whether the TDS state is in an "expanded" state or a contracted ("shrunk") state by comparing the TDS state to a threshold value or range.

According to some further approaches, the system 300 may be operative to initiate a reading sequence with the skew angle $\alpha$ at a nominal angle (e.g., 0° or some default skew angle) relative to normal to the direction of tape travel, and to adjust the skew angle $\alpha$ if a reading error is detected. In more approaches, the system 300 may be operative to initiate a reading sequence with a nominal tension on the tape 308, and to adjust the tension on the tape 308 if a reading error is detected.

In addition, the system 300 may be operative to initiate a reading sequence with the longitudinal axis of the array 302 at a nominal skew angle α (e.g., 0° or some default skew angle) relative to normal to the direction of tape travel, and to adjust the skew angle α if a reading error is detected.

In some embodiments, the system 300 may be operative to write TDS state data to a memory coupled to the tape 308, the memory being separate from the tape 308. This TDS state writing operation may preferably occur after a data writing operation. In more approaches, the system 300 may determine the TDS state and may adjust the skew angle α and the tension on the tape 308 prior to writing to the tape 308.

With continued reference to FIG. 3, in another embodiment, a system 300 includes a head 302 having an array 304 of readers, writers, servos, etc. (the array 304 includes at least readers and/or writers). The system 300 may also include more than one array of elements, such as one or more arrays of writers, one or more arrays of readers, and one or more arrays of servos. Any combination of readers, writers, combinations or reader/writer elements, etc., may be used in one or more arrays as these arrangements are specific to each individual head, and are not to be limited by the embodiments described herein.

The system 300 also includes a drive mechanism 310 for passing a magnetic recording tape 308 over the head 302, and a controller 312 in communication with the head 302, with the controller 312 being an ASIC, microprocessor, FPGA, or any other type of processing device presented herein, etc. The system 300, e.g., using the controller 312, other devices, or a combination thereof, is operative to determine a TDS state of the tape 308, lower a tension of the tape 308 across the head 302 (e.g., from its current setting, relative to a nominal or default tension, etc.) if the TDS state is in a contracted ("shrunk") state and is operative to increase a tension of the tape 308 across the head 302 (e.g., from its current setting, relative to a nominal or default tension, etc.) if the tape dimensional stability state is in an expanded state.

In some further embodiments, the system 300 may include a skew-inducing mechanism (e.g., an actuator, a piezo device, a worm screw device, etc.) coupled to the head 302 for adjusting a skew angle α of a longitudinal axis of the array 304 relative to a direction normal to a direction of tape travel over the head 302 and parallel to the plane of the tape 308. The system 300 may be operative to read from or write to the tape 308 with the skew angle α at a nominal angle (e.g., 0° or some default skew angle) relative to normal to the direction of tape travel if the TDS state is not in an "expanded" state or a contracted ("shrunk") state.

According to some approaches, the system 300 may be operative to determine whether the TDS state is in an "expanded" state or a contracted ("shrunk") state by comparing the TDS state to a threshold value or range.

The system 300 may further include a skew-inducing mechanism (e.g., an actuator, a piezo device, a worm screw device, etc.) coupled to the head 302 for adjusting a skew angle α of a longitudinal axis of the array 304 relative to a direction normal to a direction of tape travel over the head 302 and parallel to the plane of the tape 308. The system 300 may be operative to initiate a reading sequence with the skew angle α at a nominal angle (e.g., 0° or some default skew angle) relative to normal to the direction of tape travel, and to adjust the skew angle α if a reading error is detected.

In another approach, the system 300 may be operative to initiate a reading sequence with a nominal tension, and adjust the tension if a reading error is detected. In further approaches, the system may include a skew-inducing mechanism (e.g., an actuator, a piezo device, a worm screw device, etc.) coupled to the head 302 for adjusting a skew angle α of a longitudinal axis of the array 304 relative to a direction normal to a direction of tape travel over the head 302 and parallel to the plane of the tape 308. The system 300 may be operative to initiate a reading sequence with the skew angle α at a nominal angle (e.g., 0° or some default skew angle) relative to normal to the direction of tape travel, and adjust the skew angle α if a reading error is detected.

In more approaches, the system 300 may be operative to write TDS state data to a memory coupled to the tape 308, the memory being separate from the tape 308. The memory may be any type of memory, such as solid state (flash) memory, RAM, ROM, etc. This IDS state writing operation may preferably occur after a data writing operation. In more approaches, the system 300 may determine the TDS state and may adjust the skew angle α and the tension on the tape 308 prior to writing to the tape 308.

The system 300 may further include a skew-inducing mechanism (e.g., an actuator, a piezo device, a worm screw device, etc.) coupled to the head 302 for adjusting a skew angle α of a longitudinal axis of the array 304 relative to a direction normal to a direction of tape travel over the head 302 and parallel to the plane of the tape 308. The system 300 may determine the TDS state and may adjust the skew angle α and the tension prior to writing to the tape 308 based on the TDS state.

Figure 4:
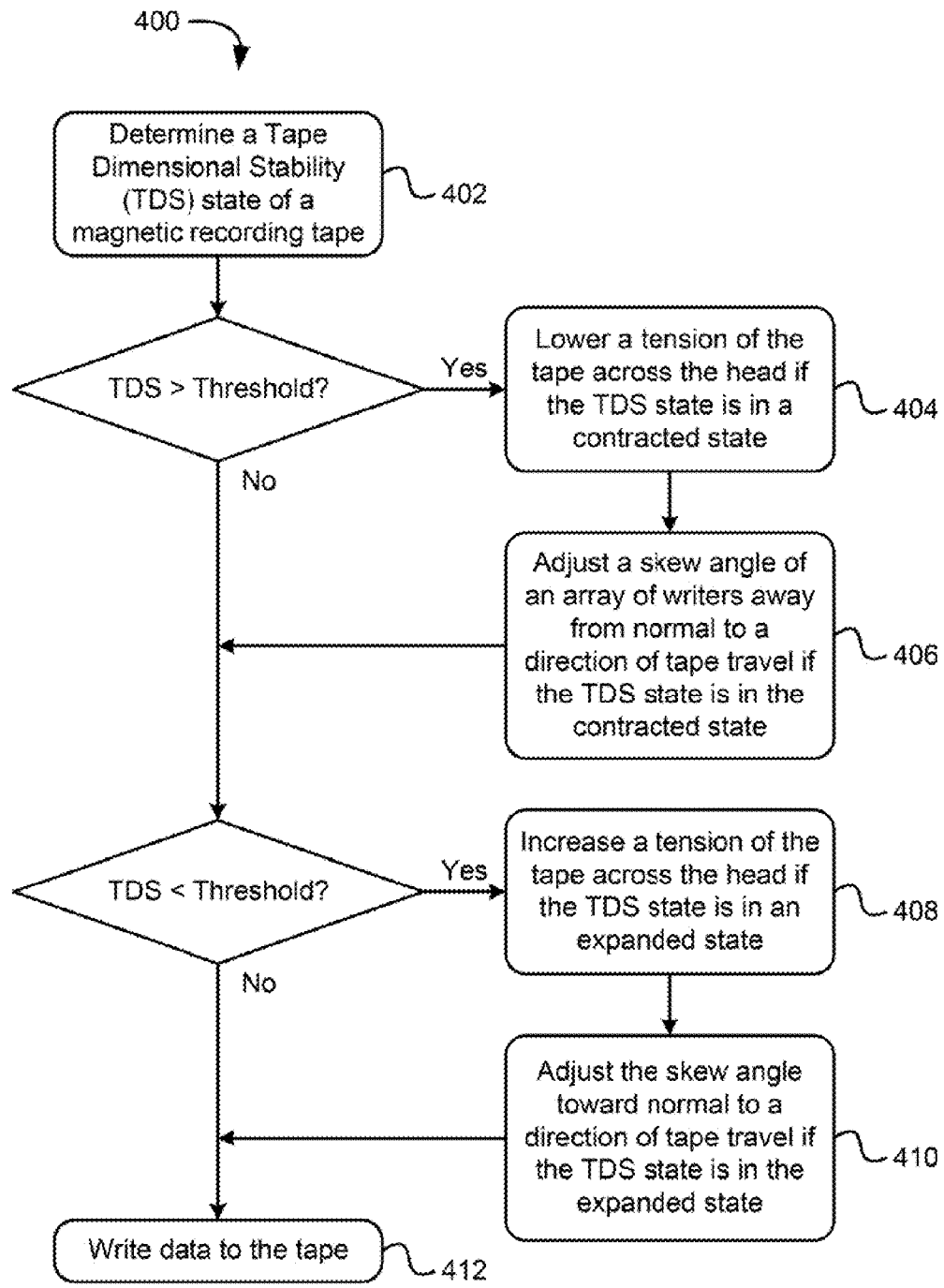
FIG. 4 is a flowchart showing a method for writing to a magnetic recording tape according to one embodiment.

Now referring to FIG. 4, a method 400 for writing to a magnetic recording tape is described according to one embodiment. The method 400 may be carried out in any desired environment, and may include aspects of the embodiments described in relation to FIGS. 1-3.

In operation 402, a tape dimensional stability (TDS) state of a magnetic recording tape is determined. The TDS data may be determined by measuring a servo pattern index stored on the magnetic recording tape from at least two servo channels, and comparing the measured pattern position to an expected pattern position across one or more intervals (e.g., every 1/100 second, every time a servo pattern is read, etc.). If one servo pattern is A1 and the second servo pattern is A2, TDS=A1−A2. In this case, if the TDS value (A1−A2) is positive, then the TDS state is in a contracted ("shrunk") state. If the TDS value (A1−A2) is negative, then the TDS state is in an "expanded" state. A TDS value (A1−A2) of zero indicates normal skew of zero and nominal tape tension for the tape type being used.

According to one embodiment, the TDS of the magnetic recording tape may be calculated by reading two servo pattern indexes from the magnetic recording tape, determining a position of the servo patterns relative to a magnetic head reading the servo pattern indexes, and calculating a tape dimensional stability (TDS) value based on the position of each servo pattern. This TDS value may be calculated by subtracting the servo pattern position of the first servo pattern index from the servo pattern Position of the second servo pattern index at any given time, by adding them together, by comparing each to a value from a chart, graph, table, etc. Also, the TDS value may be compared to a predetermined value, thereby resulting in the TDS state. For example, the TDS value may be compared to zero as described above, it may be compared to a table, chart, graph, etc.

In operation 404, a tension of the tape across the head is lowered (e.g., from its current setting, relative to a nominal or default tension, etc.) if the TDS state is in a contracted ("shrunk") state. In one approach, a contracted state may be determined when the measured servo pattern is appearing more frequently than an expected servo pattern (e.g., the servo patterns appear to be closer together than is expected from a standard or nominal servo pattern spacing). In another approach, the contracted state may be determined if the TDS value is above a threshold where the threshold may be based on a nominal value, writing condition, etc.

In operation 406, a skew angle of an array of writers is adjusted away from a direction of tape travel (e.g., relative to its current setting, relative to a nominal or default skew angle, etc.) if the TDS state is in the contracted ("shrunk") state.

In operation 408, a tension of the tape across the head is increased e.g., (from its current setting, relative to a nominal or default tension, etc.) if the TDS state is in an "expanded" state. In one approach, an "expanded" state may be determined when the measured servo pattern index is appearing less frequently than an expected servo pattern (e.g., the servo patterns appear to be farther apart than is expected from a standard or nominal servo pattern spacing). In another approach, the expanded state may be determined if the TDS value is below a threshold where the threshold may be based on a nominal value, writing condition, etc.

In operation 410, the skew angle is adjusted toward normal to a direction of tape travel (e.g., relative to its current setting, relative to a nominal or default skew angle, etc.) including adjusting the angle to 0° if the skew angle is not already 0°, if the TDS state is in the "expanded" state.

In operation 412, data is written to the tape, possibly in one or more writing operations.

In some embodiments, an error is posted if the tape is in a contracted ("shrunk") state and pre-skewing is not allowed on that generation of tape. For example, if a selection is made in a controller for writing to the tape that does not allow for pre-skewing, then an error is posted indicating that the tape is in a contracted state and correction could not be made.

Figure 5:
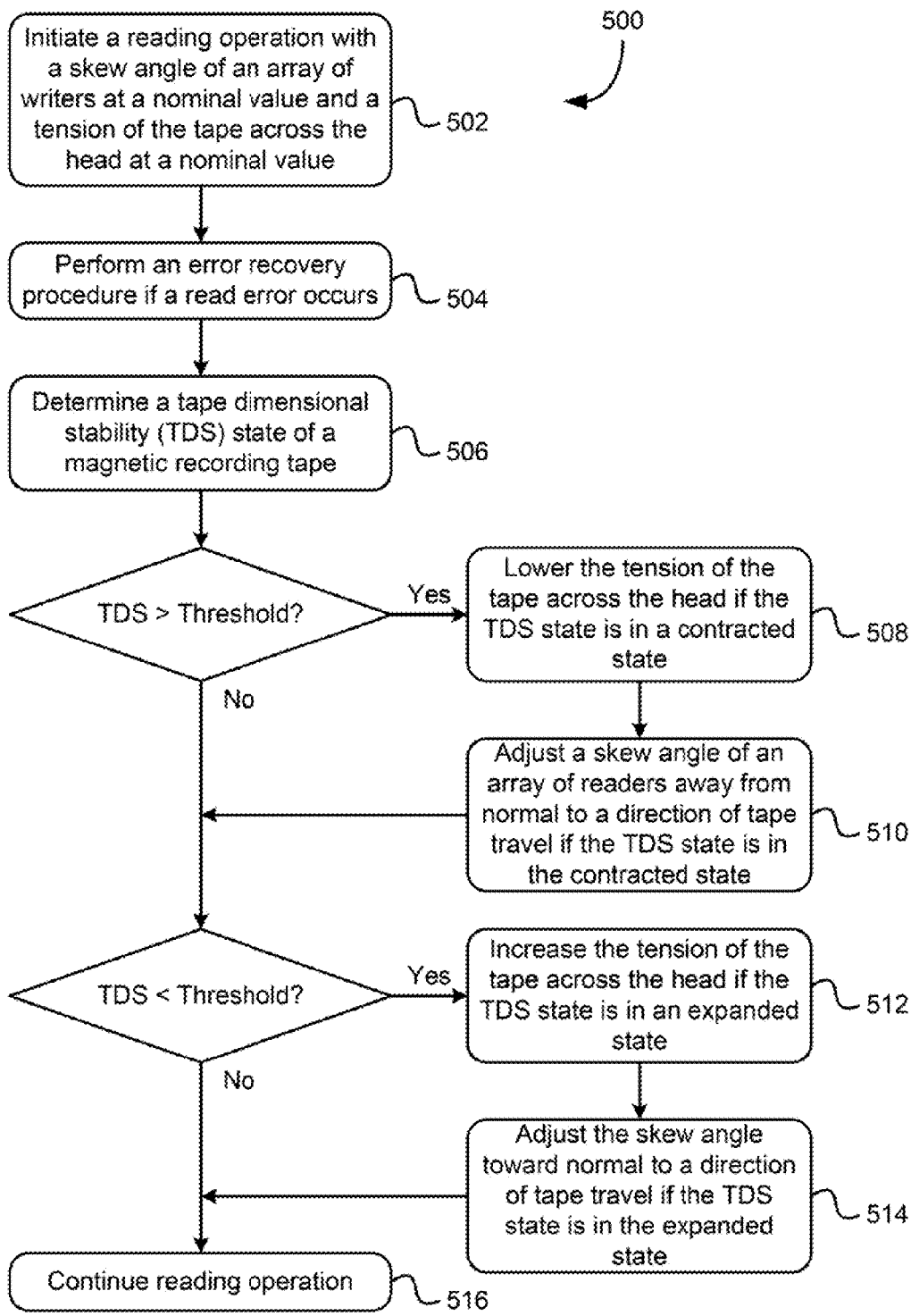
FIG. 5 is a flowchart showing a method for reading from a magnetic recording tape according to one embodiment.

Now referring to FIG. 5, a method 500 for reading from a magnetic recording tape is described according to one embodiment. The method 500 may be carried out in any desired environment, and may include aspects of the embodiments described in relation to FIGS. 1-3.

In operation 502, a reading operation is initiated with a skew angle of an array of writers at a nominal value (e.g., default value) and a tension of the tape across the head at a nominal value.

In operation 504, an error recovery procedure is performed if a read error occurs.

In operation 506, the error recovery procedure includes determining a TDS state of a magnetic recording tape.

In operation 508, the error recovery procedure continues by lowering the tension of the tape across the head (e.g., from its current setting, relative to a nominal or default tension, etc.) if the TDS state is in a contracted ("shrunk") state.

In operation 510, the error recovery procedure continues by adjusting a skew angle of an array of readers away from normal to a direction of tape travel (e.g., relative to its current setting, relative to a nominal or default skew angle, etc.) if the TDS state is in the contracted ("shrunk") state.

In operation 512, the error recovery procedure continues by increasing the tension of the tape across the head (e.g., from its current setting, relative to a nominal or default tension, etc.) if the TDS state is in an "expanded" state.

In operation 514, the error recovery procedure continues by adjusting the skew angle toward normal to a direction of tape travel (e.g., relative to its current setting, relative to a nominal or default skew angle, etc.) including adjusting the angle to 0° if it is not already 0° and if the TDS state is in the "expanded" state.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a head having an array of at least one of readers and writers;
    a drive mechanism for passing a magnetic recording tape over the head;
    a skew-inducing mechanism coupled to the head for adjusting a skew angle of a longitudinal axis of the array relative to a direction normal to a direction of tape travel over the head; and
    a controller in communication with the head,
    wherein the system is operative to:
        determine a tape dimensional stability state of the tape; and
        adjust the skew angle away from normal to the direction of tape travel and lower a tension of the tape across the head if the tape dimensional stability state is in a contracted state.

2. The system of claim 1, wherein the system is further operative to adjust the skew angle toward normal to the direction of tape travel and increase a tension of the tape across the head if the tape dimensional stability state is in an expanded state.

3. The system of claim 2, wherein the system is operative to read from or write to the tape with the skew angle at a nominal angle relative to normal to the direction of tape travel if the tape dimensional stability state is not in an expanded state or a contracted state.

4. The system of claim 2, wherein the system is further operative to determine whether tape dimensional stability state is in an expanded state or a contracted state by comparing a tape dimensional value associated with the tape dimensional stability state to a predetermined value or range.

5. The system of claim 2, wherein the system is operative to initiate a reading sequence with the skew angle at a nominal angle relative to normal to the direction of tape travel, and adjust the skew angle if a reading error is detected.

6. The system of claim 2, wherein the system is operative to initiate a reading sequence with a nominal tension, and adjust the tension if a reading error is detected.

7. The system of claim 6, wherein the system is operative to initiate a reading sequence with the longitudinal axis of the array at a nominal angle relative to normal to the direction of tape travel, and adjust the angle if a reading error is detected.

8. The system of claim 1, wherein the system is operative to write tape dimensional stability state data to a memory coupled to the tape, the memory being separate from the tape.

9. The system of claim 1, wherein the system determines the tape dimensional stability state and adjusts the skew angle and the tension prior to writing to the tape.

10. A system, comprising:
    a head having an array of at least one of readers and writers;
    a drive mechanism for passing a magnetic recording tape over the head; and
    a controller in communication with the head,
    wherein the system is operative to:
        determine a tape dimensional stability state of the tape;
        lower a tension of the tape across the head if the tape dimensional stability state is in a contracted state; and
        increase a tension of the tape across the head if the tape dimensional stability state is in an expanded state; and
    further comprising a skew-inducing mechanism coupled to the head for adjusting a skew angle of a longitudinal axis of the array relative to a direction normal to a direction of tape travel over the head, wherein the system is operative to read from or write to the tape with the skew angle at a nominal angle relative to normal to the direction of tape travel if the tape dimensional stability state is not in an expanded state or a contracted state.

11. The system of claim 10, wherein the system is further operative to determine whether tape dimensional stability state is in an expanded state or a contracted state by comparing the tape dimensional stability state to a threshold value or range.

12. The system of claim 10, wherein the system is operative to initiate a reading sequence with a nominal tension, and adjust the tension if a reading error is detected.

13. The system of claim 10, wherein the system is operative to write tape dimensional stability state data to a memory coupled to the tape, the memory being separate from the tape.

14. A system, comprising:
a head having an array of at least one of readers and writers;
a drive mechanism for passing a magnetic recording tape over the head; and
a controller in communication with the head; and
a skew-inducing mechanism coupled to the head for adjusting a skew angle of a longitudinal axis of the array relative to a direction normal to a direction of tape travel over the head, wherein the system is operative to initiate a reading sequence with the skew angle at a nominal angle relative to normal to the direction of tape travel, and adjust the skew angle if a reading error is detected,
wherein the system is also operative to:
determine a tape dimensional stability state of the tape;
lower a tension of the tape across the head if the tape dimensional stability state is in a contracted state; and
increase a tension of the tape across the head if the tape dimensional stability state is in an expanded state.

15. A system, comprising:
a head having an array of at least one of readers and writers;
a drive mechanism for passing a magnetic recording tape over the head;
a controller in communication with the head; and
a skew-inducing mechanism coupled to the head for adjusting a skew angle of a longitudinal axis of the array relative to a direction normal to a direction of tape travel over the head, wherein the system is operative to initiate a reading sequence with the longitudinal axis of the array at a nominal angle relative to normal to the direction of tape travel, and adjust the angle if a reading error is detected;
wherein the system is operative to initiate a reading sequence with a nominal tension, and adjust the tension if a reading error is detected
wherein the system is operative to:
determine a tape dimensional stability state of the tape;
lower a tension of the tape across the head if the tape dimensional stability state is in a contracted state; and
increase a tension of the tape across the head if the tape dimensional stability state is in an expanded state.

16. A system, comprising:
a head having an array of at least one of readers and writers;
a drive mechanism for passing a magnetic recording tape over the head;
a controller in communication with the head;
wherein the system is operative to:
determine a tape dimensional stability state of the tape;
lower a tension of the tape across the head if the tape dimensional stability state is in a contracted state; and
increase a tension of the tape across the head if the tape dimensional stability state is in an expanded state; and
further comprising
a skew-inducing mechanism coupled to the head for adjusting a skew angle of a longitudinal axis of the array relative to a direction normal to a direction of tape travel over the head, wherein the system determines the tape dimensional stability state and adjusts the skew angle and the tension prior to writing to the tape based on the tape dimensional stability state.

17. A method for writing to a magnetic recording tape, comprising:
determining a tape dimensional stability state of a magnetic recording tape;
lowering a tension of the tape across the head if the tape dimensional stability state is in a contracted state;
adjusting a skew angle of an array of writers away from normal to a direction of tape travel if the tape dimensional stability state is in the contracted state;
increasing a tension of the tape across the head if the tape dimensional stability state is in an expanded state;
adjusting the skew angle toward normal to a direction of tape travel if the tape dimensional stability state is in the expanded state; and
writing data to the tape.

18. The method of claim 17, wherein determining a tape dimensional stability state of a magnetic recording tape comprises:
reading two servo pattern indexes from the magnetic recording tape;
determining a position of the servo patterns relative to a magnetic head reading the servo pattern indexes; and
calculating a tape dimensional stability value based on the position of each servo pattern.

19. A method for reading from a magnetic recording tape, comprising:
initiating a reading operation with a skew angle of an array of writers at a nominal value and a tension of the tape across the head at a nominal value; and
performing an error recovery procedure if a read error occurs, the error recovery procedure comprising:
determining a tape dimensional stability state of a magnetic recording tape;
lowering the tension of the tape across the head if the tape dimensional stability state is in a contracted state;
adjusting a skew angle of an array of readers away from normal to a direction of tape travel if the tape dimensional stability state is in the contracted state;
increasing the tension of the tape across the head if the tape dimensional stability state is in an expanded state; and
adjusting the skew angle toward normal to a direction of tape travel if the tape dimensional stability state is in the expanded state.

* * * * *